(12) United States Patent
Villegas et al.

(10) Patent No.: US 8,513,947 B2
(45) Date of Patent: Aug. 20, 2013

(54) DETECTION OF TOOL IN PIPE

(75) Inventors: Laurent Villegas, Houston, TX (US);
Christopher S. Del Campo, Houston, TX (US); Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 24 days.

(21) Appl. No.: 13/101,836

(22) Filed: May 5, 2011

(65) Prior Publication Data

US 2011/0285398 A1 Nov. 24, 2011

Related U.S. Application Data

(60) Provisional application No. 61/347,209, filed on May 21, 2010.

(51) Int. Cl.
*G01V 3/00* (2006.01)

(52) U.S. Cl.
USPC .......................................................... 324/338

(58) Field of Classification Search
USPC .......................................................... 324/338
See application file for complete search history.

(56) References Cited

U.S. PATENT DOCUMENTS

| | | | |
|---|---|---|---|
| 2,868,506 A | | 1/1959 | Bell et al. |
| 4,349,072 A | * | 9/1982 | Escaron et al. ............ 166/254.2 |
| 7,681,642 B2 | | 3/2010 | Bell et al. |
| 2001/0054969 A1 | | 12/2001 | Thomeer et al. |
| 2002/0050930 A1 | | 5/2002 | Thomeer et al. |

OTHER PUBLICATIONS

International Search Report and Written Opinion dated Nov. 25, 2011 for corresponding PCT Application No. PCT/US2011/036387 filed May 13, 2011.

* cited by examiner

*Primary Examiner* — Reena Aurora
(74) *Attorney, Agent, or Firm* — Kenneth Liu; Jody Lynn DeStefanis

(57) ABSTRACT

Methods and systems for determining whether a tool has been deployed below a drill pipe are provided. A downhole tool can measure various characteristics, which then can be analyzed to determine the likelihood of a tool having been deployed below the drill pipe. For example, density and porosity measurements can be affected by the presence of casing or drill pipe, and thus such measurements can provide an indication of whether the tool has been deployed below the drill pipe.

19 Claims, 9 Drawing Sheets

DETECTION OF TOOL IN PIPE

CROSS-REFERENCE TO RELATED APPLICATIONS

This application claims priority to, and hereby incorporates by reference herein, U.S. Provisional Application No. 61/347,209, filed on May 21, 2010.

TECHNICAL FIELD

The invention relates generally to the field of logging a borehole. More specifically, the invention relates to determining the appropriate time and/or location to activate a tool conveyed downhole.

BACKGROUND

Downhole tools can be conveyed in multiple ways as they are lowered into the borehole or while drilling the borehole. Traditional approaches are the conveyance of the tool on wireline by lowering the tool on a cable that also provides power to the tool and communication between the tool and the surface. Alternatively, the tool can be conveyed by slickline. In this case, the tool is lowered on a cable that is used solely to convey the tool but does not provide power or communication. The tool functions in an autonomous way and has its own downhole power (typically batteries). Limited down communication can be achieved by accelerating the cable in a certain pattern. Tools can also be conveyed at the bottom of drill pipe (e.g., Tough Logging Conditions or "TLC") if borehole conditions do not allow the tool to reach the bottom of the hole. This may be of particular interest in highly deviated or horizontal wells, where gravity will not allow the tool to reach the bottom of the well. In this kind of logging the wireline is inside the drill pipe and the logging therefore is very similar to traditional wireline logging.

Pushing tools down on a drill string may result in damage to the tools as they are used to push past obstacles in the wellbore. The operation of TLC is expensive and often requires logging cable and a logging truck. An alternative method is to deploy the tool through drill pipe, letting it exit the drill pipe and latch it to the bottom of the drill pipe. Once this is done, the drill pipe is pulled out of the hole while the tool is logging and recording the data in its internal memory.

In drill pipe conveyed logging, there may be little or no communication between the downhole tool and the surface. This poses several problems, many of which are due to the fact that the exact time at which the logging tool is latched to the bottom of the drill pipe is not known. In order not to exhaust the battery too early, the power to the tool should only be enabled once the tool is ready to log up.

Additional problems exist for pad density tools equipped with a caliper arm to eccentralize the pad and to measure the hole diameter or any similarly-equipped device with a caliper arm. These arms generally do not allow a tool to move down when they are open. If a tool is being pushed down with the caliper arm open, it may get stuck and with enough applied force the arm will bend or break.

It may be desirable, therefore, for the caliper arm to be opened only when the tool is ready to move up, which, in most cases, is a few minutes after it has been deployed. In the absence of any communication from the surface, it is not possible for the tool to detect whether deployment has been successful. According to conventional methods, the enabling of the tool power and opening of a caliper is generally based on a timer. This timer is set just before the tool is lowered into the drill pipe to be pumped down. The setting generally has to leave enough time to allow for the tool to be pumped down and deployed. As there can be multiple delays in the deployment this time has to be set very long (i.e., building in excess time). If the deployment is quick then there is a long wait after the deployment before the tool can start moving up.

Thus, needs in the art exist for systems and methods that address some of the deficiencies in conventional tools, such as some of the deficiencies described above.

DETAILED DESCRIPTION OF THE EXAMPLE EMBODIMENTS

Some embodiments will now be described with reference to the figures. Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
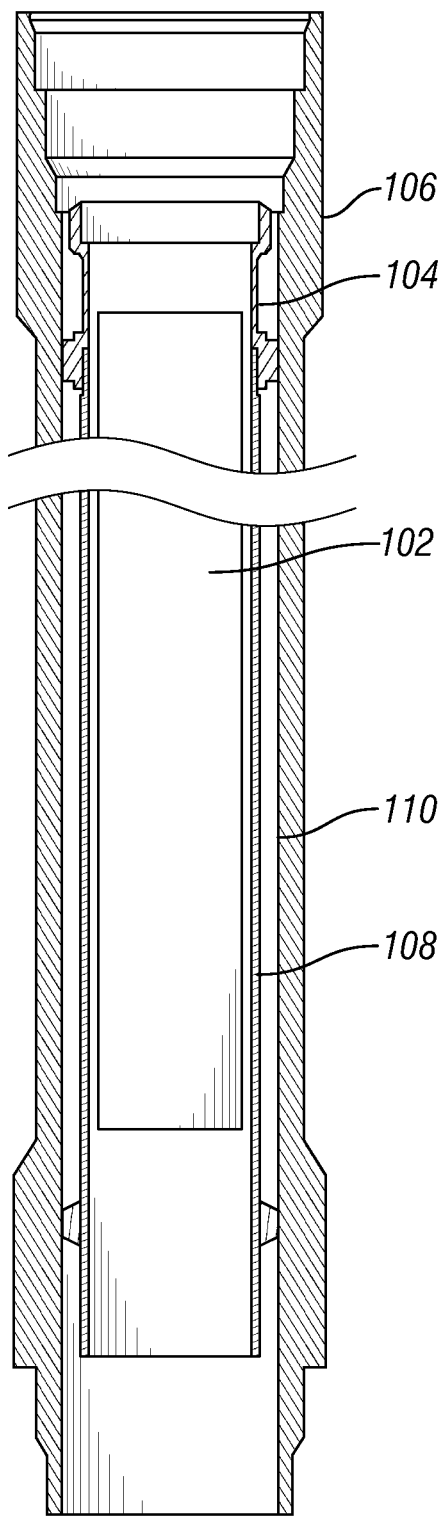
FIG. 1 is a diagram of a tool within a drill pipe, according to an example embodiment.

FIG. 1 is a diagram of a tool 102 within a drill pipe, according to an example embodiment. The example tool 102 is shown disposed within an inner housing or protective sleeve 104 and within an outer housing or special drill pipe 106. In an example embodiment, either or both of the protective sleeve 104 and the special drill pipe 106 can be made from steel. In a particular embodiment, where both the protective sleeve 104 and special drill pipe 106 are made from steel, the tool 102 can be surrounded by about 0.55 in of steel (cumulatively between the protective sleeve 104 and special drill pipe 106). Other than iron, in certain embodiments, the materials making up the protective sleeve 104 and special drill pipe 106 can include about 1% manganese and 1% chromium. The inner gap 108 between the tool 102 and the protective sleeve 104, as well as the outer gap 110 between the (centralized) protective sleeve 104 and the special drill pipe 106 are filled with drilling mud. The flow of drilling mud through these gaps can, in example embodiments, assist in carrying the tool 102 downhole through the drill pipe until the protective sleeve 104 and tool 102 reach the end of the drill string. In certain embodiments, the special drill pipe 106 may be different from ordinary drill pipe in that it is the last joint of drill pipe in the drill string. In certain embodiments, the special drill pipe 106 also can include some type of latching mechanism (not shown) for attaching to the tool 102 when the tool 102 is ejected from the protective sleeve 104. In some embodiments, the special drill pipe 106 can comprise a material and configuration substantially identical to or similar to the rest of the drill pipe, and may simply be the final joint of the drill string. In other embodiments, the special drill pipe 106 can have a different configuration to better house the latching mechanism. In various embodiments, the latching mechanism can arrest the motion of the tool 102 relative to the drill pipe, once the tool 102 is substantially exposed.

The foregoing description is just one embodiment of a drill pipe carrier. Other embodiments with different geometries and different metal alloys are possible, as may be recognized by one of ordinary skill in the art having the benefit of the present disclosure. Considerations to take into account in selecting materials to use in the construction of the drill pipe carrier include minimizing erosion, minimizing or fighting corrosion, and extending fatigue life in high-dogleg boreholes.

While the tool 102 is disposed within the drill string (such as shown in FIG. 1), the presence of the large amount of steel around the tool 102 can have a significant effect on the tool response, which may be dominated by the high attenuation of the steel and the effect of the mud inside the drill pipe. However, the tool 102 generally remains sensitive to the surrounding borehole 214 and the formation 216. A large variability in the response is possible because the tool 102 is not oriented. For example, in an embodiment where the tool 102 is a density tool, the density pad 220 can point towards the borehole 214 or the formation 216.

Figure 2:
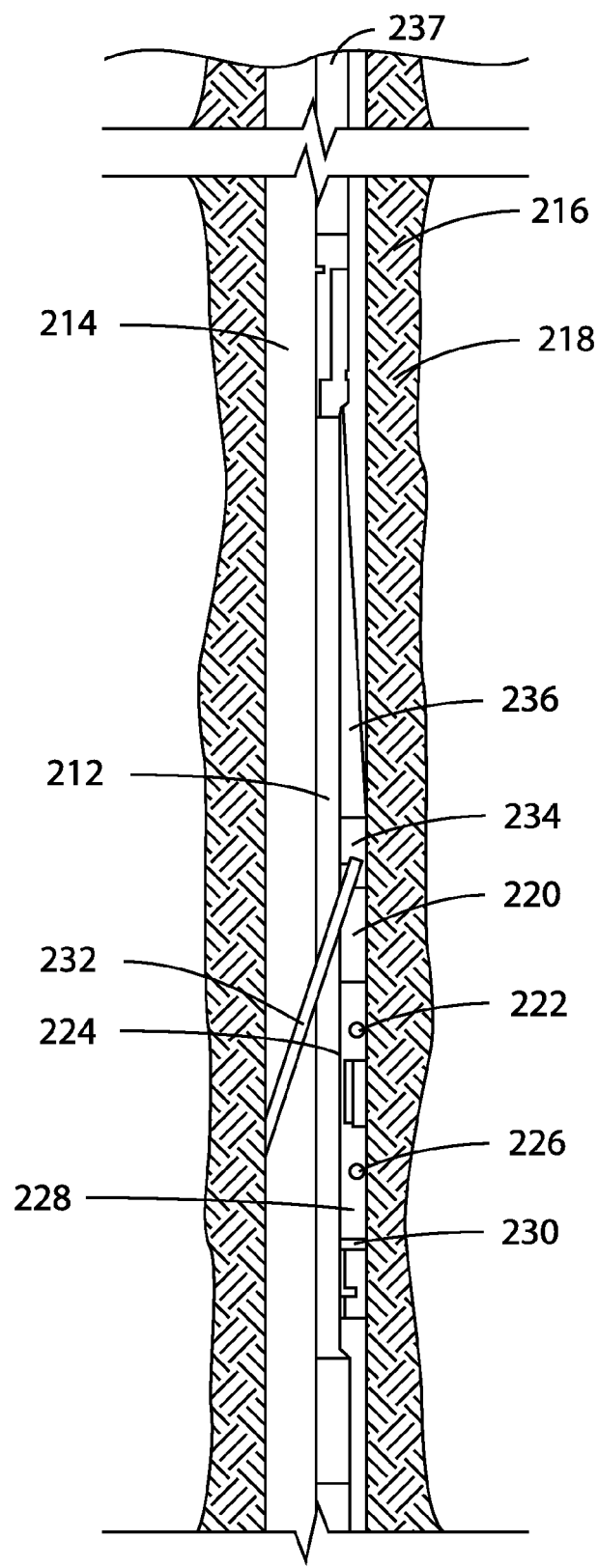
FIG. 2 is a diagram of a density tool deployed within a borehole, according to an example embodiment.

FIG. 2 is a diagram of a density tool 212 (which can be the tool 102 represented in FIG. 1) deployed within a borehole 214, according to an example embodiment. In an example embodiment, above the section of the density tool 212 shown in FIG. 2, the tool string 237 carrying the density tool 212 is latched to the end of the drill string, as described above. As shown in FIG. 2, the density tool 212 is disposed within a borehole 214 of a formation 216. Additionally, the density tool 212 includes a density pad 220, a long-spaced detector 222 and shield 224, a short-spaced detector 226 and shield 228, and a gamma-ray source 230. These components can be identical to or similar to components used in conventional density tools, as may be recognized by one of ordinary skill in the art having benefit of the present disclosure. The density tool 212 also can have a caliper arm 232 hingedly connected to the tool via a hinge 234, with mechanics for operating the caliper in a caliper mechanical section 236.

As shown in FIG. 2, the caliper arm 232 can be in extended position, extended such that the caliper arm 232 makes contact with (or approaches contacting) the borehole 214 wall. The caliper hinge 234 additionally allows the caliper to be in a recessed position (not shown) in which the caliper can be generally in line with the axis of the tool. As discussed above, it is desirable to have the caliper arm 232 extend from the tool axis to the extended position after the tool has been ejected from the protective sleeve 104 and deployed from the drill string (and then latched thereto). In some embodiments, it can be important that the caliper not be deployed if the tool is still moving downward.

As discussed above, certain complications exist when attempting to deploy certain tools in the borehole 214, particularly due to the inability to know when the tool has reached the position (e.g., at the end of the drill pipe) where the tool is to be deployed. As will be discussed in more detail below, using measurements in the tool string (such as, in example embodiments, measurements from a density tool 212) can allow the determination of whether the tool has been deployed from the drill string. In the particular example of the density tool 212 with a caliper, the density measurement can be used directly to determine whether the tool finds itself inside the drill pipe. Alternatively, other measurements (neutron porosity, resistivity, sonic etc) can be used to make the detection.

In example embodiments, the use of the density measurement in conjunction with the opening of the density caliper can be attractive since the measurements are collocated. As will be discussed in more detail below, permission to open the caliper can be based on a voting system, in which some measurements can veto the opening. Once the command to open the caliper has been given, the caliper can start opening in certain embodiments. If at the end of the process of opening the caliper, the measured diameter is below a predetermined value, the caliper can be closed again in certain embodiments. A new attempt can be made after a predetermined wait time. In example embodiments, a new attempt at opening the caliper will only be made when the measurement conditions are satisfied. The fact that the caliper can be opened and that the tool is deployed can also be used to provide a signal to power up all the tools in the string, if this has not already happened.

In certain embodiments, measurements made by a density tool 212, such as the density tool 212 of FIG. 2, can be used to help determine whether the density tool 212 has been deployed from the drill string (and therefore the caliper arm 232 can be extended), or whether instead the density tool 212 is still within the drill pipe (in which case the caliper arm 232 should not be extended). Certain examples of the significance of these measurements made by a density tool 212 will now be described with reference to the following FIGS. 3-8.

Figure 3:
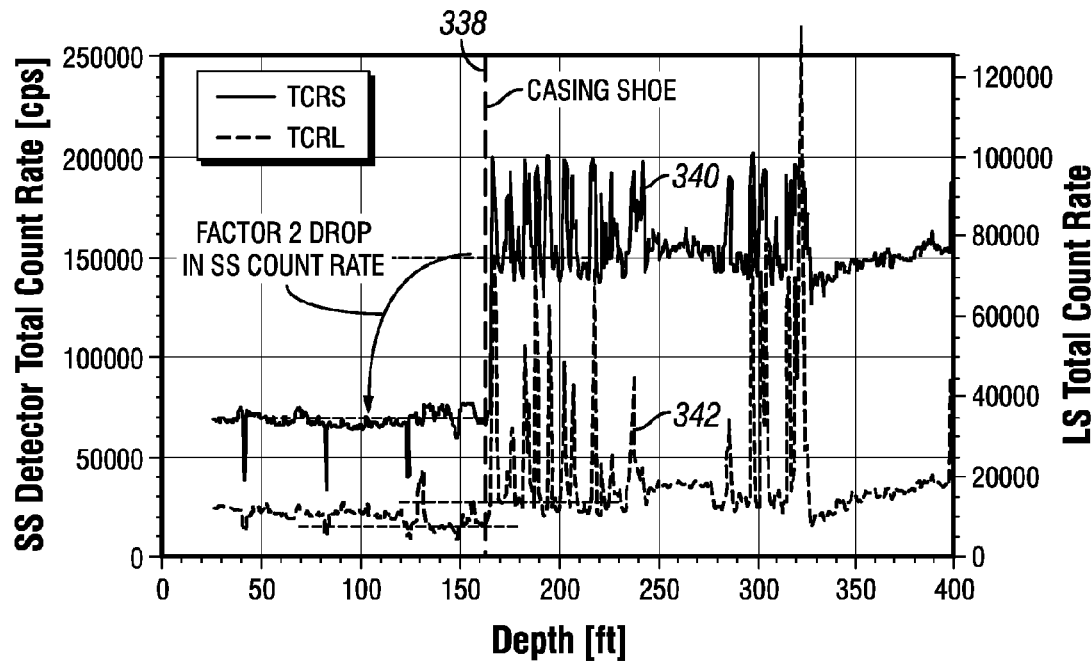
FIG. 3 is a graph plotting depth versus the count rates of the short-spaced detector and the long-spaced detector, according to an example embodiment.

In example embodiments, the measurement of the density tool 212 inside drill pipe is similar to the situation of the tool inside casing, and thus an estimate of a response of a density tool 212 being within a drill pipe can be obtained by looking at the density tool 212 response in casing. An example of the effect of casing is shown in FIG. 3, which is a graph plotting depth versus the count rates of the short-spaced detector 226 and the long-spaced detector 222, according to an example embodiment. As the tool enters the casing (e.g., shown by the line 338 at approximately 165 ft of depth), the count rate line 340 corresponding to the short-spaced detector 226 (i.e., in certain embodiments, the detector closer to the gamma-ray or x-ray source 230) drops sharply. The count rate line 342 corresponding to the long-spaced detector 222 drops less significantly. It is understood that the count rates may need to be calibrated using a calibration reference in order to take into account source 230 strength differences and tool-to-tool response differences.

Figure 4:
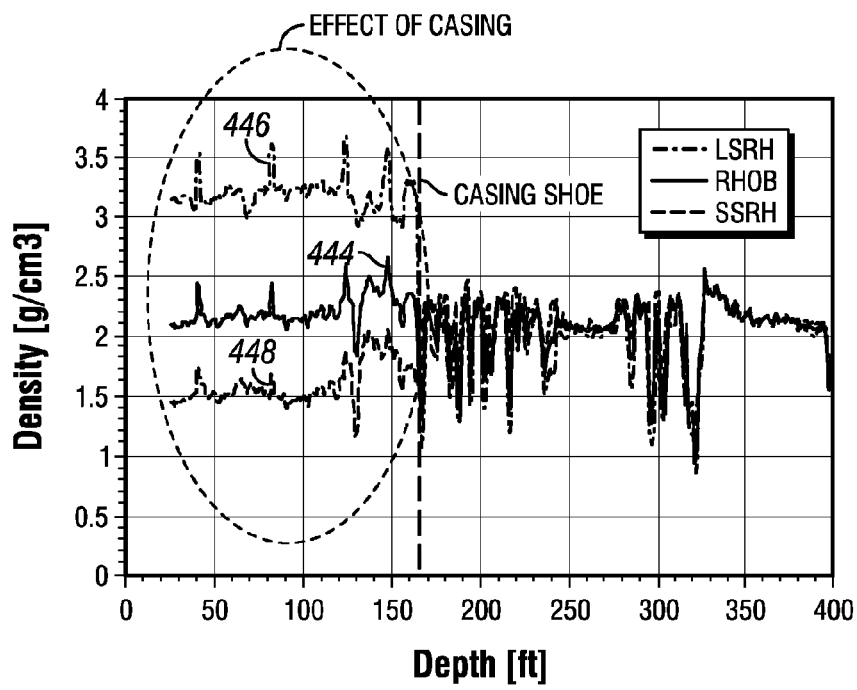
FIG. 4 is a graph plotting depth versus long-spaced apparent density, short-spaced apparent density, and the compensated density (RHOB) when the tool is in casing or drill pipe, according to an example embodiment.

FIG. 4 is a graph plotting depth versus long-spaced apparent density 444, short-spaced apparent density 446, and the compensated density (RHOB) 448 when the tool is in casing or drill pipe, according to an example embodiment. As shown particularly by the section showing the effect of the casing, all three density lines jump as the tool enters casing or drill pipe. In the example shown in FIG. 4, the largest effect is seen on the short-spaced density. This can be due to the larger relative change in count rate and the lower density sensitivity of the short-spaced detector 226, i.e. a small change in the short-spaced count rate corresponds to a large change in the apparent density. The long-spaced density, which has a deeper depth of investigation, can be less affected, as shown in FIG. 4. The compensated density (RHOB) drops to a lower value (overcompensation).

FIG. 3 and FIG. 4 show that there can be a significant effect of steel surrounding the tool on the total count rates and the density answer. Although they change significantly, the count rates may not always give an unambiguous indication of whether the tool is in casing. Looking at the apparent densities shows that entering into casing or drill pipe can lead to a sharp increase in the difference between the long-spaced and short-spaced apparent densities. This will result in a large negative deltaRho. As will be discussed herein, this fact can be exploited to detect whether the tool is inside drill pipe.

Figure 5:
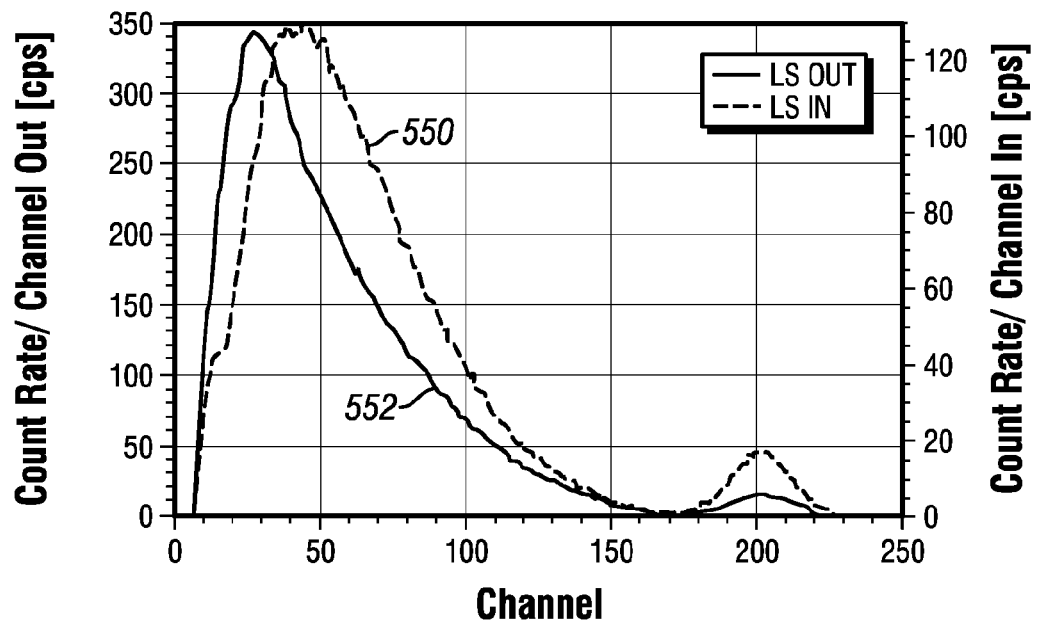
FIG. 5 is a graph plotting the channel versus long-spaced energy spectrum in and out of the casing, according to an example embodiment.
Figure 6:
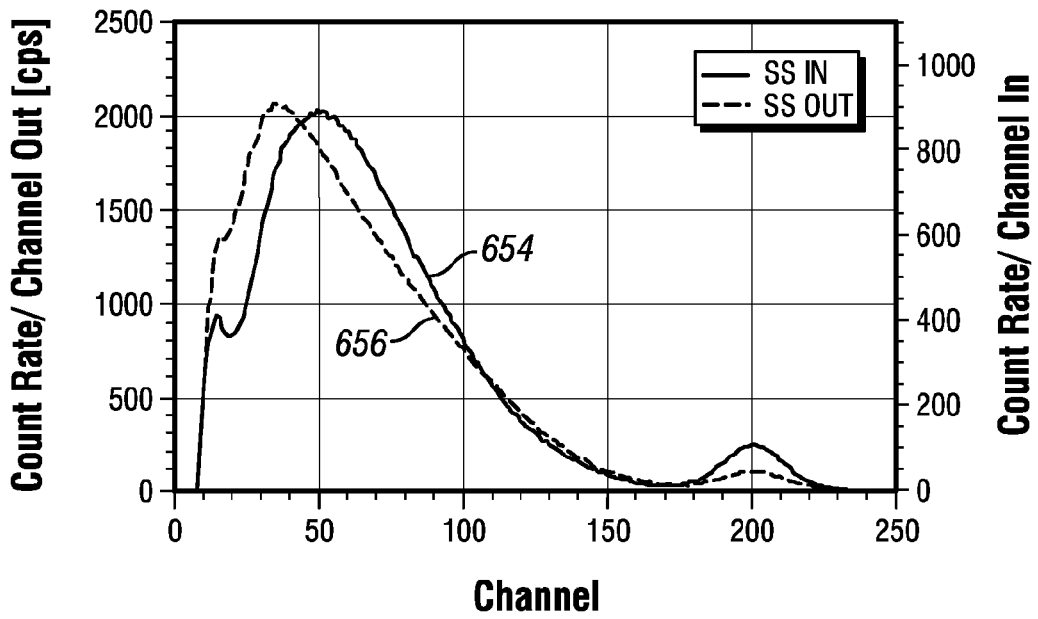
FIG. 6 is a graph plotting the channel versus short-spaced energy spectrum in and out of the casing, according to an example embodiment.

In example embodiments, the presence of iron around the tool also can have a strong effect on the spectral shape. Absorption of low energy gamma-rays in the iron can remove most of the low energy part of the spectrum. The effect of entering casing or drill pipe on the long-spaced and short-spaced spectra is shown in FIG. 5, which is a graph plotting the channel versus long-spaced energy spectrum in 550 and out 552 of the casing according to an example embodiment, and FIG. 6, which is a graph plotting the channel versus short-spaced energy spectrum in 654 and out 656 of the casing according to an example embodiment. In both figures, the scales have been adjusted so that the spectra have a similar maximum height to give a clearer picture of the difference in spectral shape.

Figure 7:
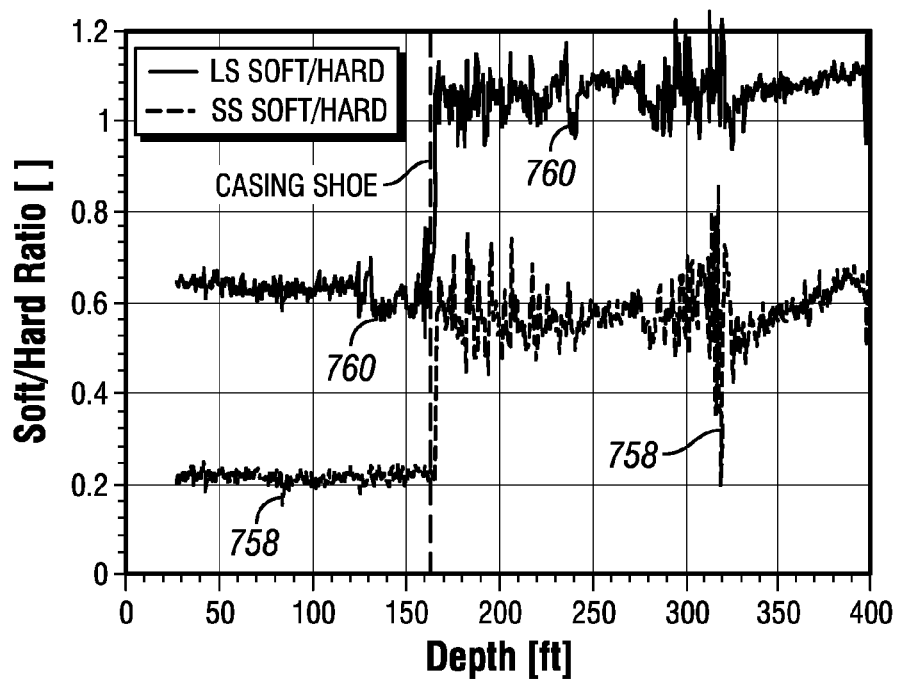
FIG. 7 is a graph plotting the windows ratios W1/(W3+W4) for the short-spaced and long-spaced detectors, according to an example embodiment.

The change in spectral shape can also be reflected in the ratio of the spectral window count rates. FIG. 7 is a graph plotting the windows ratios 758, 760 W1/(W3+W4) for the short-spaced 226 and long-spaced detectors 222, according to an example embodiment. W1 represents the low energy window (soft radiation), W3 and W4 the high energy part of the spectrum (hard radiation). Low energy gamma-rays or x-rays are not very penetrating and are often called soft radiation. Radiation with higher energy is significantly more penetrating as is therefore called hard radiation. As can be seen in FIG. 7, a dramatic change in the windows ratios for both the short-spaced 226 and long-spaced detectors 222 occurs in example embodiments when the tool goes from outside the casing to inside the casing.

Figure 8:
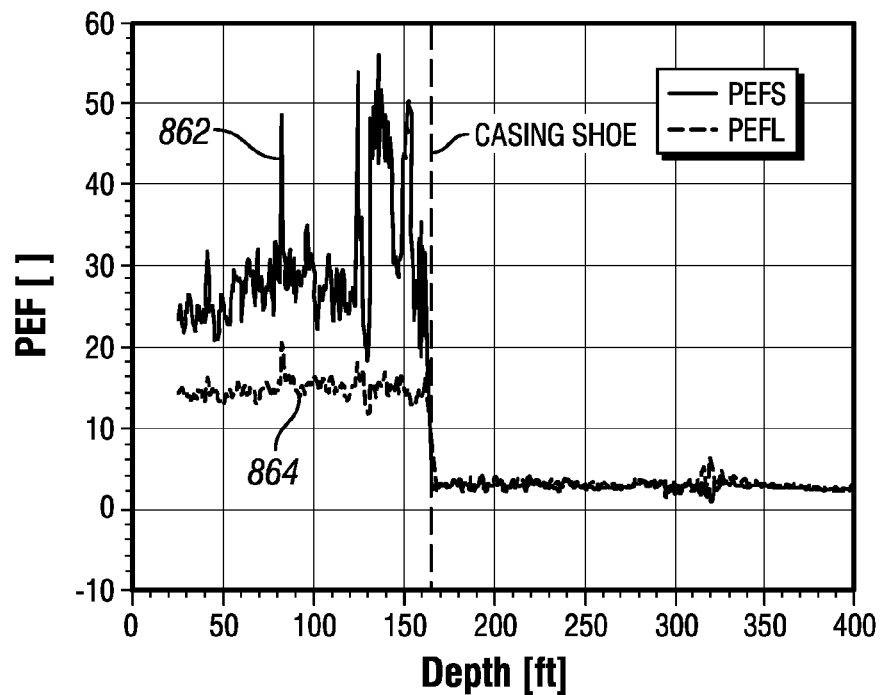
FIG. 8 is a graph plotting depth versus the long-spaced and short-spaced apparent photoelectric factor (PEF), according to an example embodiment.

FIG. 8 is a graph plotting depth versus the long-spaced 864 and short-spaced 862 apparent photoelectric factor (PEF), according to an example embodiment. The graph thus illustrates an example effect the casing has on PEF. As the tool enters the casing there is a large increase in the measured PEF of the long-spaced 222 and short-spaced detectors 226. In some embodiments, this is a direct consequence of the suppression of low energy gamma-rays in the casing or drill pipe.

The majority of the foregoing description and figures address the effect of casing or drill pipe on measurements made by an example density tool 212. In some embodiments, other or additional approaches can be used for determining the presence of a tool inside casing or drill pipe. In one such embodiment, the determination of density, PEF, and borehole 214 parameters like borehole 214 fluid density, presence of barite, standoff, and the like can be based on a forward model based on multiple spectral windows. An example density tool 212 for making these measurements can be the PLATFORM EXPRESS density tool of the assignee of the present application. An inversion of the forward model can give an indication of the presence of the tool in drill pipe.

In a first example, the presence of drill pipe can be inferred from the reconstruction error when solving for the quantities above when using a model valid for open hole only. An open hole forward model does not properly describe the cased hole environment. When inverting the forward model to obtain the unknowns, this will result in a poor fit or reconstruction. Therefore a large reconstruction error would be indicative of the presence of casing.

In a second example, a model including the presence of drill pipe can be used. An example inversion can solve for a quantity related to the presence or absence of drill pipe. An example of such a quantity is the thickness of steel surrounding the tool. The inversion of an OH forward model may attempt to solve for tool standoff, mud weight and mud Pe (photoelectric effect). In the presence of casing, the inversion may show increased mud weight and mud Pe and therefore signal the presence of casing. If the forward model includes a cased hole description, then it will solve for casing thickness and the presence of casing will be directly indicated by the inversion.

Alternatively, a database and a neural network can be used to detect the presence or absence of drill pipe. A neural network, which is properly configured, will attempt to find the best match between a database of known situation (responses) and the observed response. If the database is limited to open hole, the neural network will indicate the lack of an acceptable solution. If a cased hole (including drill pipe) characterization is in the database the neural network will indicate the presence of casing and/or drill pipe.

If the tool is used in a well known environment, additional input can be provided by using local knowledge, which could allow for tighter limits on the measurements made by the tool to be imposed. Such inputs may be the casing weight (typically given in lb/ft), mud weight, drill pipe inner and outer diameter to name a few. Other methods consistent with this disclosure can be used, as may be recognized by one of ordinary skill in the art having benefit of the present disclosure.

Additionally, in some embodiments, a neutron tool response can be used to try and determine whether the tool is inside the carrier or deployed. In some embodiments, the neutron tool may provide three count rates on which the determination can be based. Other numbers of count rates are also possible. In another embodiment, neutron tool information can be used to corroborate the results obtained from density. As with the density measurement, the count rates alone may not give sufficient information to allow a vote.

In some cases, e.g. Platform Express density, a resistivity measurement is collocated with the density measurement on the same pad. The resistivity measurement may show very low resistivity in the presence of drill pipe or casing. This low reading may be used to determine whether the tool is inside drill pipe. In a different embodiment, there could be a simple dedicated resistivity measurement, e.g. one or more resistivity measurement buttons collocated with the density measurement or close to it, which are used for the detection of casing or drill pipe. Such a measurement device could also be installed on the caliper arm.

Alternatively, it is possible to install an ultrasonic device on the density pad (or mandrel) collocated with the density measurement or within a short distance of it. The ultrasonic measurement is sensitive to the presence of drill pipe or casing and the measurement may be used to determine whether the tool is in drill pipe. Yet another collocated measurements could be a dielectric measurement (Schlumberger Dielectric Scanner), which is very sensitive to the presence of drillpipe or casing.

Figures 9A, 9B:
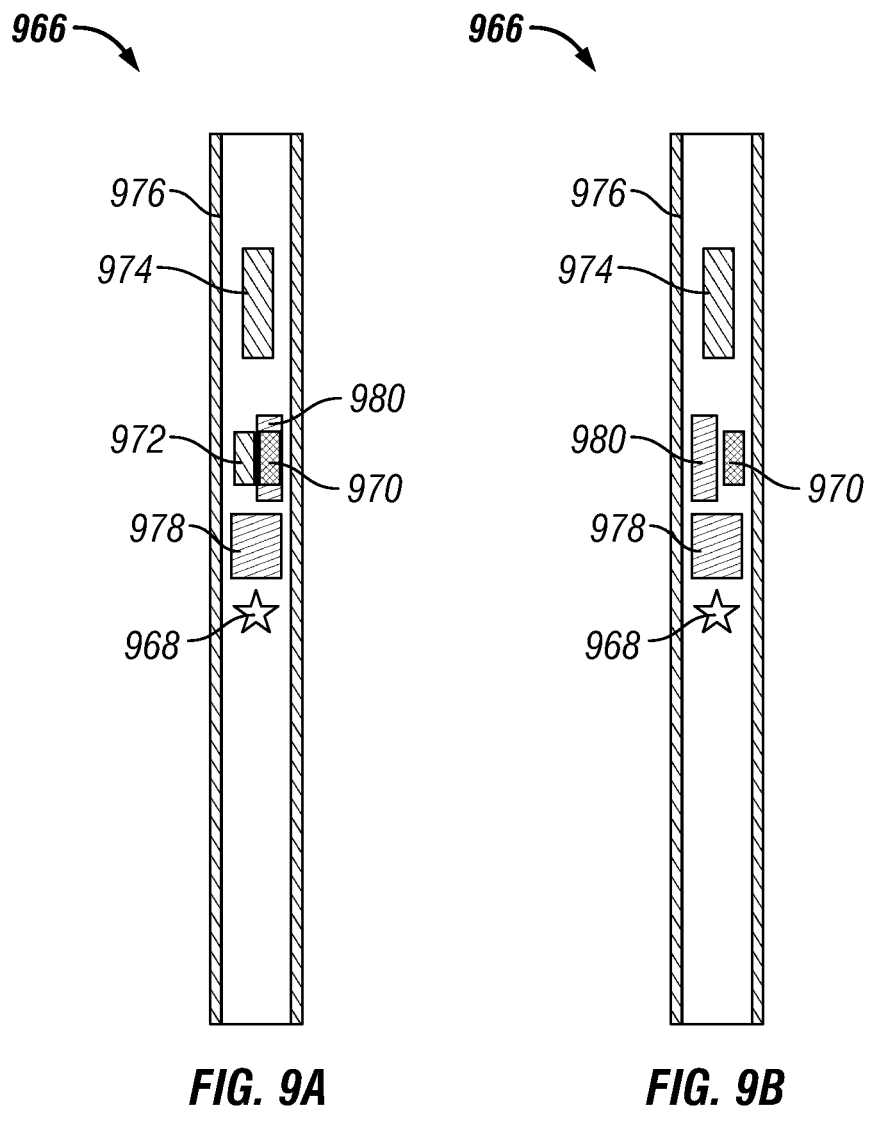
FIG. 9 is a diagram of a neutron tool, according to an example embodiment.

FIG. 9 is a diagram of a neutron tool 966, according to an example embodiment. In an example embodiment, the neutron tool 966 contains a neutron source 968 (e.g., an AmBe source 968, but the source 968 need not be limited to the use of a radioisotope source). Additionally, the neutron tool 966 can include three neutron detectors. Two detectors can be mounted side-by-side at a first axial spacing from the source 968. One of these detectors can be a detector of epithermal neutrons (e.g., the near epithermal detector 970), the second detector (e.g., the near thermal detector 972) can be a detector of thermal neutrons—including epithermal ones. A third detector—the far detector 974, which can be a thermal neutron detector, is at a farther axial spacing. Other embodiments could include two or more thermal detectors at two or more spacings, two or more epithermal detectors on two or more spacings or another combination such as those that may be recognized by one of ordinary skill in the art having benefit of the present disclosure. The neutron tool 966 can further include a tool housing 976, as well as shielding 978 and backshielding 980.

As with the density measurement, in some embodiments, count rates may need to be calibrated to a reference calibration standard in order to account for variability in source 968 strength and tool-to-tool response differences.

Figure 10:
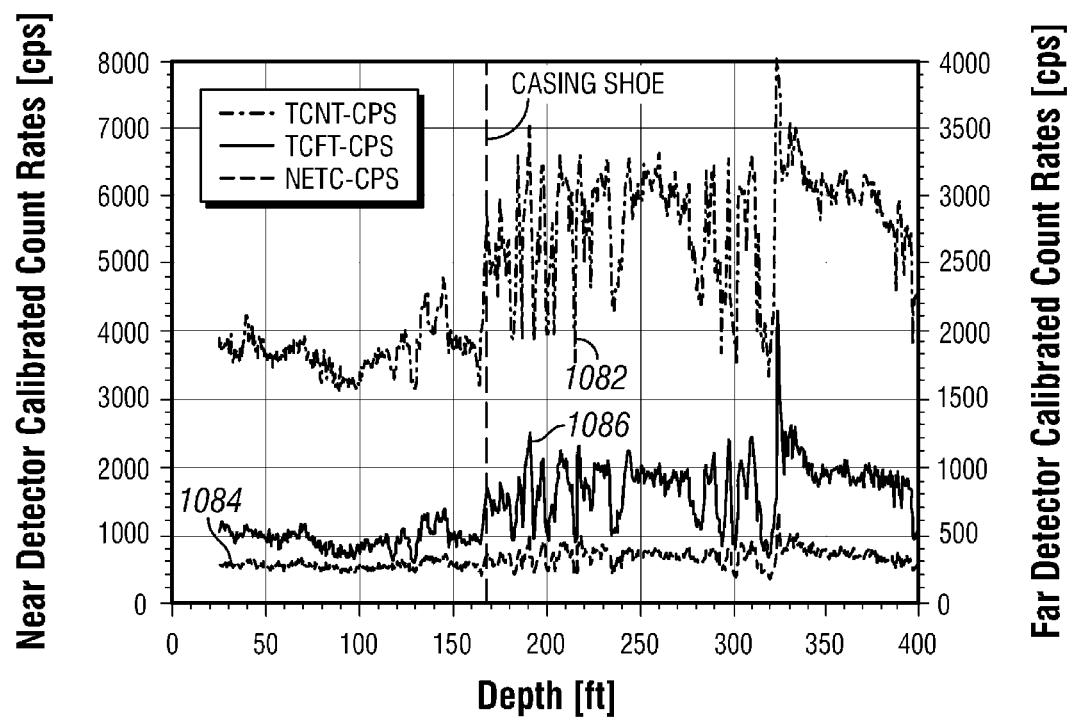
FIG. 10 is a graph plotting depth versus the count rates of the near detectors and the far detector, according to an example embodiment.

Like with the density tool 212 described above with reference to FIGS. 2-8, in example embodiments, measurements of the neutron tool 966 inside drill pipe is similar to the situation of the tool inside casing, and thus an estimate of a response of a neutron tool 966 being within a drill pipe can be obtained by looking at the neutron tool 966 response in casing. An example of the effect of casing is shown in FIG. 10, which is a graph plotting depth versus the count rates of the near detectors (thermal 972 and epi-thermal 970) and the far detector 974, according to an example embodiment. As the tool enters the casing (e.g., shown by the line at approximately 165 ft of depth), the thermal count rates 1082, 1086 drop sharply. However, the low count rates are still in the range of the count rates that could be observed in open hole at high porosity and/or salinity. The count rates may therefore not give an unambiguous indication whether the tool is inside the casing (or inside the deployment sleeve). The count rate 1084 of the epithermal detector 970 shows virtually no change when entering the casing. This could be an indication that ratios of count rates could be used to detect the transition from cased to open hole.

Figure 11:
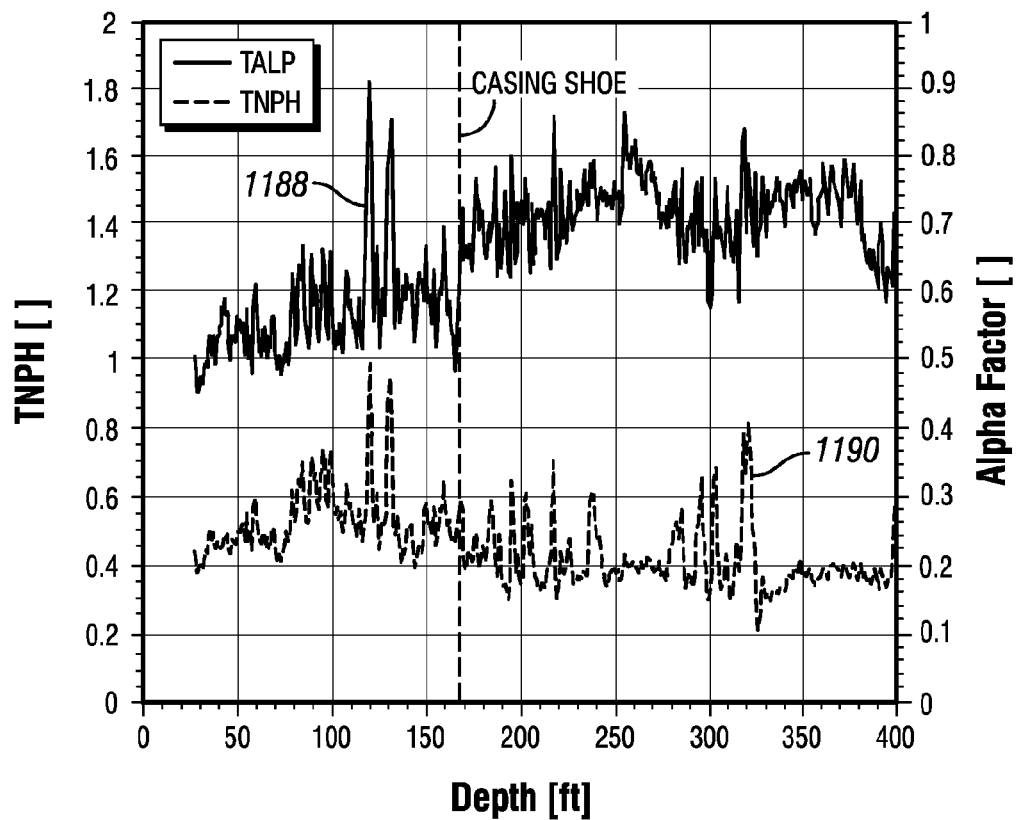
FIG. 11 is a graph plotting depth versus thermal neutron porosity (TNPH) and thermal alpha factor (TALP), according to an example embodiment.

FIG. 11 is a graph plotting depth versus thermal neutron porosity (TNPH) 1190 and thermal alpha factor (TALP) 1188, according to an example embodiment. This shows the thermal neutron porosity and the alpha factor that is used in the enhanced resolution processing. The alpha factor represents the ratio between TNPH and the apparent near thermal detector 972 porosity that is used to obtain an answer with a higher vertical resolution. The alpha factor represents therefore the discrepancy between TNPH and the less accurate porosity that can be obtained from the near thermal detector 972 count rate. A drop in the alpha factor indicates that the near detector porosity differs more from the ratio porosity. As shown, the alpha factor can have low values in open hole. This can be overcome by deriving a more accurate single detector porosity algorithm and/or by basing the alpha factor on a more complex function of the ratio porosity and the near thermal neutron porosity.

Figure 12:
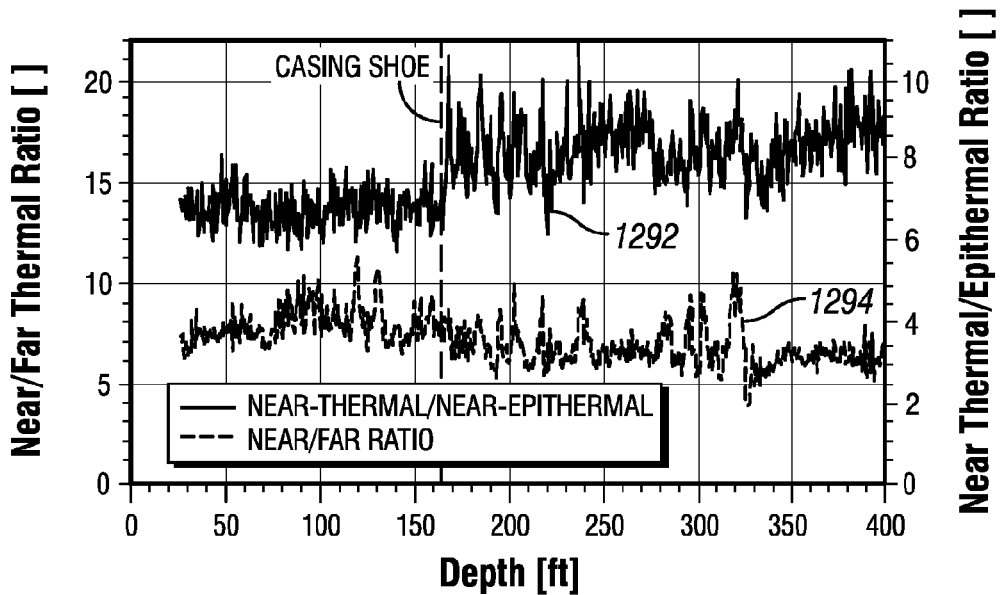
FIG. 12 is a graph plotting depth versus an exemplary Near/Far thermal count rate ratio and also an exemplary (Near Thermal)/(Near epithermal) count rate ratio, according to an example embodiment.

FIG. 12 is a graph plotting depth versus an exemplary Near/Far thermal count rate ratio 1294 and also an exemplary (Near Thermal)/(Near epithermal) count rate ratio 1292, according to an example embodiment. As shown, the ratio of the two near count rates in this example shows a clear indication as the tool enters casing. Accordingly, in some embodiments, the (Near Thermal)/(Near epithermal) count rate ratio can probably be exploited as an indicator.

As stated repeatedly, the approaches to use neutron measurements for the detection of whether the tool is outside casing are not exhausted by the above examples. Some additional example possibilities include the following. In some example embodiments, a deltaphi (i.e. the difference between the near and near/far thermal porosities) can be used as a casing indicator, which could be analogous to the use of deltaRho in the case of density. Another example can be to use the relative change (e.g., difference, ratio or other functional form) of the apparent porosities derived from all three detector count rates as an indicator. In some example embodiments, such as where a tool has a pulsed neutron source 968, epithermal slowing down time (SDT) or Sigma can be used as further indicators, as the near epithermal/thermal ratio can serve as an indication of Sigma. Moreover, with the density measurement, the above solutions can be used with neural networks. Additionally, using local knowledge, tighter limits can be imposed on the measurements.

Additionally, in some embodiments other types of measurements in the tool string can be used to determine whether the tool is deployed, such as induction, phasor-induction, acoustic, nuclear magnetic resonance and/or sonic measurements. In some embodiments, if the measurement made is below the density tool 212, then the fact that the tool below has been deployed may not be a certain indication that the tool above has been deployed.

Again, other systems and methods consistent with this disclosure can be used, as may be recognized by one of ordinary skill in the art having benefit of the present disclosure.

In example embodiments, based on the example results in the preceding sections, an algorithm can be used to indicate to the tool whether it should be powered up, open the caliper arm 232 and start acquisition. If the tool can detect by itself, whether it is outside of the drill pipe, the deployment can be made more efficient and the risk of damage to the tool or premature depletion of the battery will decrease.

Figure 13:
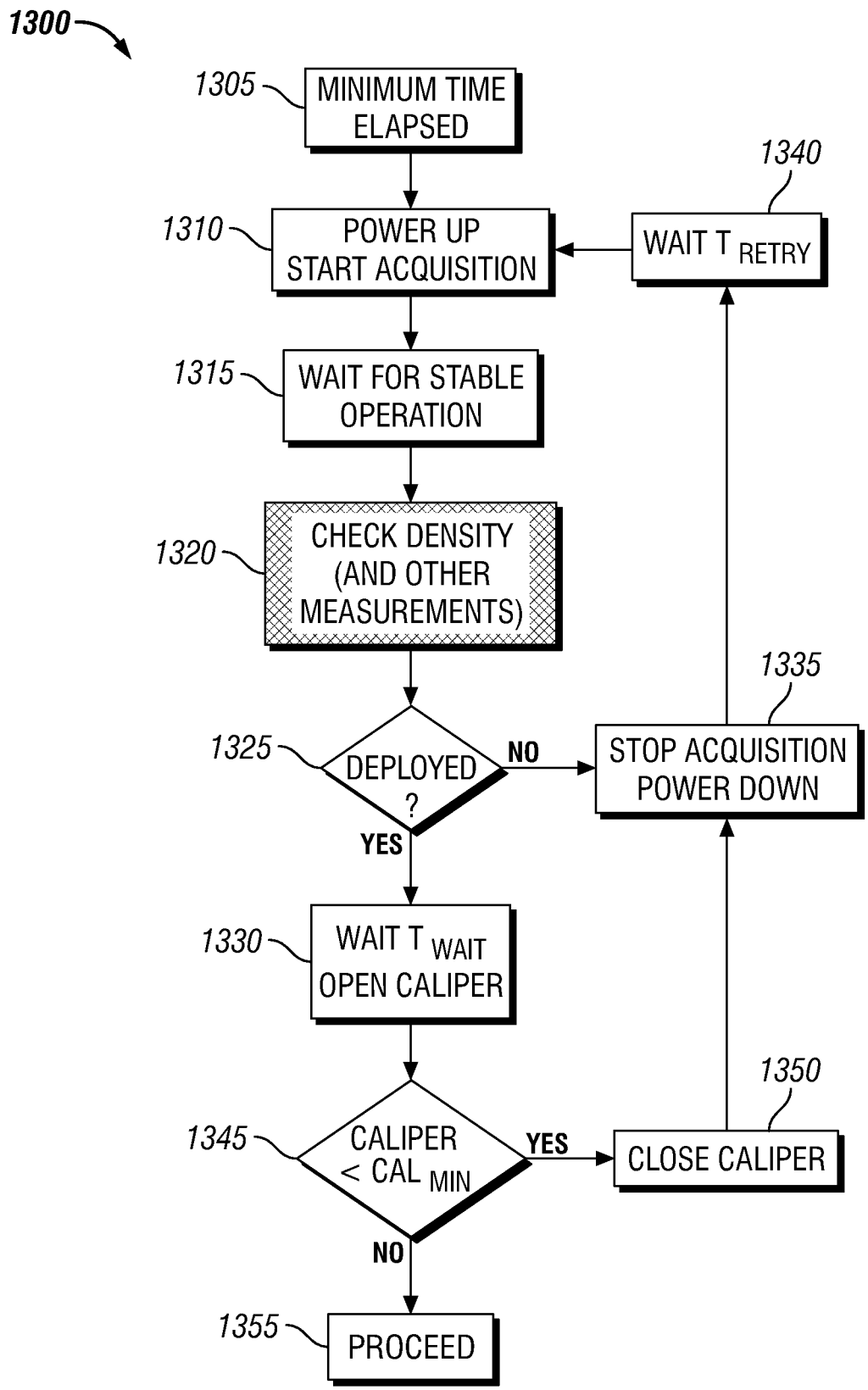
FIG. 13 is a flow diagram of an auto-detect algorithm or method, according to an example embodiment.

The new algorithm can complement or supersede the approaches already in place. One example implementation of such an algorithm is shown in FIG. 13, which is a flow diagram of an auto-detect algorithm or method according to an example embodiment. In certain embodiments, it may be assumed that a minimum amount of time needs to elapse before the tool will try to detect whether it is ready for deployment. The time can be set when initializing the tool before lowering it into drill pipe. Alternatively, the timer could start once a certain pressure (or possibly temperature) is reached. This may require a pressure (temperature) sensor and minimal electronics to be continuously enabled.

As shown in FIG. 13, in step 1305, a minimum amount of time has elapsed. After the predetermined time, in step 1310, the tool string (or at least a predetermined tool in the string) will wake up and power up. In step 1315, the tool waits for all the loops to stabilize so that reliable measurements can be made. As will be recognized by one of ordinary skill in the art having benefit of the present disclosure, steps can be performed to ensure there has not been a hardware failure to prevent additional damage and/or wasted time waiting for all loops to stabilize.

In step 1320, the density measurement (and any others) are checked to determine whether the tool (or at least the density or other appropriate section) is outside the drill pipe. In step 1325, the method 1300 determines whether the density section (or other appropriate section) has been deployed from the drill pipe. If the measurements indicate that the tool has been or is being deployed, the method 1300 branches to step 1330, where it waits for a predetermined time (enough to allow full deployment to make sure that any downward movement due to the deployment has stopped). If the measurements indicate that the tool has not yet been deployed set a time for the next test and power down, the method branches to step 1335, where the measurement acquisition and power are stopped, then proceeds to step 1340 where time passes until returning to step 1305.

Once the method 1300 reaches and completes step 1330 and the caliper is attempted to be opened, the method 1300 then determines in step 1345 whether caliper was successfully opened. In other words, in an example embodiment, the method 1300 determines whether the caliper reading indicates that the tool is outside the drill pipe, as discussed above.

If the measurement indicates that the caliper could not open, the method 1300 branches to step 1350, where the caliper is closed, and then proceeds to step 1340. If, however, the measurement indicates that the caliper could open, the method 1300 branches to step 1355, where the caliper proceeds to make the measurement.

In another example embodiment, some or all of the foregoing techniques can be used to create a test to determine whether the tool has been deployed. However, in some embodiments, the detailed parameters for the various tests can only be defined after some modeling and experimentation. Table 1, shown below, lists an example set of required experiments and modeling, with conditions for density detector vote according to an exemplary embodiment. In some embodiments, the density check needs to assure in multiple ways that the tool is deployed. Additionally, precautions may need to be taken to allow acquisition if a sensor has failed.

In an example embodiment, the proposed approach is based on the following conditions to allow opening the caliper: (1) there need to be at least two "yes" votes for opening the caliper; and (2) there is no veto. Additionally, in some embodiments, if the long-spaced hardware shows a failure, the caliper may not be opened but acquisition can be enabled to make sure that the measurements continue. In some example embodiments, once the caliper has opened no further checks are performed. Additionally, if the short-spaced hardware fails, a single vote can be needed to open the caliper, since a usable answer can often be obtained with the long-spaced density alone.

TABLE 1

| Measurement | Conditions | Input for limit calculation | Barite (or Cs-formate) | Caliper vote | Acq vote |
|---|---|---|---|---|---|
| Long-spaced detector | | | | | |
| All LS | HW ok | Status flags (TBD) | n/a | Abstain | Abstain |
|  | HW not ok | | | | Abstain |
| LS PEF | <$PEF_{max}$, HW OK | BS | Yes or No | Yes | Yes |
|  | >$PEF_{max}$, HW OK | | No | | |
|  | >$PEF_{max}$, HW OK | | Yes | Abstain | Abstain |
| LS Density | HW OK | n/a | n/a | Abstain | Abstain |
| Short-spaced detector | | | | | |
| All SS | HW ok | Status flags (TBD) | n/a | Abstain | Abstain |
|  | HW not ok | | | Abstain | Abstain |
| SS PEF | <$PEF_{max}$, HW OK | BS | Yes or No | Yes | Yes |
|  | >$PEF_{max}$, HW OK | | No | | |
|  | >$PEF_{max}$, HW OK | | Yes | Abstain | Abstain |
| SS Density | <$\rho_{max}$ HW OK | BS | n/a | Abstain | Abstain |
|  | >$\rho_{max}$ HW OK | | n/a | | |
| $\rho_{LS}$-$\rho_{SS}$ | | | | | |
| $\rho_{LS}$-$\rho_{SS}$ | >$\delta\rho_{min}$, HW OK | BS | n/a | Yes | Yes |
|  | <$\delta\rho_{min}$, HW OK | BS | n/a | | |

As to the example methods and steps described in the embodiments presented previously, they are illustrative, and, in alternative embodiments, certain steps can be performed in a different order, in parallel with one another, omitted entirely, and/or combined between different exemplary methods, and/or certain additional steps can be performed, without departing from the scope and spirit of the invention. Accordingly, such alternative embodiments are included in the invention described herein. For example, instead of basing the decision on the density measurement or the density measurement alone, the decision can be made based on neutron measurements (see above) or other measurements in the tool (sonic, resistivity) which are all sensitive to the presence of the drill pipe surrounding the tool, including resistivity measurements, sonic measurements, NMR measurements, dedicated sensor or magnet for pipe detection, a sensor on or near density pad, a sensor in other parts of the toolstring, and a sensor configured to detect latching of the tool.

Additionally, although some of the disclosure specifically refers to drill pipe conveyance tools, as one of ordinary skill in the art may recognize with the benefit of the present disclosure, certain aspects of the foregoing disclosure could apply to tools and toolstrings used in wireline, logging-while-drilling and/or measuring-while-drilling applications, or other methods of conveyance, in addition.

The invention can comprise a computer program that embodies the functions described herein and illustrated in the flow charts. However, it should be apparent that there could be many different ways of implementing the invention in computer or algorithmic programming, and the invention should not be construed as limited to any one set of program instructions. Further, a skilled programmer would be able to write such a program to implement an embodiment of the disclosed invention based on the flow charts and associated description in the application text. Therefore, disclosure of a particular set of program code instructions is not considered necessary for an adequate understanding of how to make and use the invention.

The invention can be used with computer hardware and software that performs the methods and processing functions described above. Specifically, in describing the functions, methods, and/or steps that can be performed in accordance with the invention, any or all of these steps can be performed by using an automated or computerized process. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A toolstring for carrying a tool deployed through drill pipe, comprising:
    a sensor for making a measurement, the measurement giving an indication as to whether the tool has been deployed below the drill pipe, the sensor being located on the toolstring;
    wherein the toolstring is powered up for logging upon a determination that the tool has been deployed below the drill pipe, the determination that the tool has been deployed below the drill pipe being based on the indication.

2. The toolstring of claim 1, wherein the measurement comprises a plurality of measurements made by the sensor, and wherein the sensor comprises a plurality of sensors.

3. The toolstring of claim 1, wherein acquisition of log data is started based on the determination that the tool has been deployed below the drill pipe.

4. The toolstring of claim 1, wherein the toolstring is latched to a bottom of the drill pipe.

5. The toolstring of claim 1, wherein the measurement comprises at least one of: a gamma-gamma density and photoelectric factor (PEF) measurement using one or more gamma-ray detectors.

6. The toolstring of claim 5, wherein the measurement comprises at least one of: calibrated count rates in one or more of the gamma-ray detectors compared to predetermined limits.

7. The toolstring of claim 1, wherein the measurement comprises at least one of:
    an ultrasonic measurement made by a device on a density pad on the toolstring;
    a dielectric measurement; and
    a resistivity measurement substantially collocated with a density measurement.

8. The toolstring of claim 1, wherein the measurement comprises at least one of:
    apparent gamma-gamma density compared to predetermined limits;
    a difference between apparent densities measured by two or more gamma-gamma density detectors;
    a spectral shape of a gamma-ray spectrum measured with one or more detectors;
    count rates from multiple gamma ray detectors, wherein the count rates are input into a forward model, and wherein the indication is based on a reconstruction error from the inversion of the forward model; and
    count rates from multiple detectors entered in a neural network that determine a presence or absence of drill pipe.

9. The toolstring of claim 1, wherein the measurement is based on a ratio between counts in a low energy spectral window and counts in a high energy spectral window in a spectrum.

10. The toolstring of claim 1, wherein the measurement comprises at least one of:
    a forward model and inversion of count rates from a plurality of energy windows of density detectors to obtain density and PEF; and
    a forward model of the count rates of the one or more gamma-ray detectors in one or more energy windows, where the forward model includes the response to drill pipe around the tool and inversion an inversion solving for the presence of drill pipe around the tool.

11. The toolstring of claim 1, wherein the measurement comprises a measurement made with a neutron porosity tool containing at least one thermal or epithermal detector.

12. The toolstring of claim 11, wherein the measurement comprises calibrated count rates of one or more detectors based on preset limits of the count rates.

13. The toolstring of claim 11, wherein the measurement comprises at least one of:
    a difference between an apparent porosity based on the ratio of a count rate of a far neutron detector and a near neutron detector and an apparent porosity based on the count rate of a near thermal neutron detector;
    a difference between an apparent porosity based on a count rate of a far neutron detector and an apparent porosity based on the count rate of a near thermal neutron detector;
    a ratio between (a) an apparent porosity based on a count rate of a far neutron detector, and (b) an apparent porosity based on the count rate of a near thermal neutron detector; and
    a ratio between (a) an apparent porosity based on a count rate ratio of a far neutron detector and a near neutron detector, and (b) an apparent porosity based on the count rate of a near thermal neutron detector.

14. The toolstring of claim 1, wherein a caliper attached to the toolstring is opened based on a positive indication, and wherein if the caliper cannot open beyond a predetermined value, the caliper is subsequently closed.

15. The toolstring of claim 14, wherein the measurement is repeated after a predetermined wait time to determine if the caliper can be opened.

16. The toolstring of claim 1, wherein the measurement comprises at least one of: a resistivity measurement, an induction measurement, a galvanic resistivity measurement, a nuclear magnetic resonance measurement, a sonic measurement, an ultrasonic measurement, and a measurement from a magnetic sensor.

17. The toolstring of claim 1, wherein the tool comprises a pulsed neutron porosity and spectroscopy tool, and
wherein the measurement comprises at least one of:
neutron slowing down time measurements for at least one detector;
a thermal neutron decay (sigma) measurement; and
a gamma-spectroscopy of neutron-induced gamma-rays.

18. The toolstring of claim 1, wherein the one or more measurements yields a voting pattern, and wherein the power to the toolstring is enabled based on the voting pattern.

19. A method for determining whether a tool has been deployed below a drill pipe, comprising:
making at least one downhole measurement with the tool; and
determining whether the tool has been deployed below the drill pipe based on the at least one downhole measurement;
wherein acquisition of log data is started based on the determination that the tool has been deployed below the drill pipe,
wherein the measurement comprises at least one of: a gamma-gamma density and photoelectric factor (PEF) measurement using one or more gamma-ray detectors,
wherein a caliper attached to the toolstring is opened based on a positive indication,
wherein if the caliper cannot open beyond a predetermined value, the caliper is subsequently closed, and
wherein the measurement repeated after a predetermined wait time to determine if the caliper can be opened.

* * * * *